US012645639B1

(12) United States Patent
Hickey et al.

(10) Patent No.: US 12,645,639 B1
(45) Date of Patent: Jun. 2, 2026

(54) SNAPSHOT OPERATIONS THROUGH NAMESPACE METADATA INDEXING USING A KEY VALUE STORE ON A CLUSTER FILESYSTEM

(71) Applicant: Dell Products L.P., Round Rock, TX (US)

(72) Inventors: Charles Hickey, Aptos, CA (US); Murthy V. Mamidi, Queen Creek, AZ (US); Neerajkumar Chourasia, San Ramon, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/036,976

(22) Filed: Jan. 24, 2025

(51) Int. Cl.
*G06F 16/11* (2019.01)
*G06F 16/13* (2019.01)
*G06F 16/174* (2019.01)
(52) U.S. Cl.
CPC .......... *G06F 16/128* (2019.01); *G06F 16/137* (2019.01); *G06F 16/1748* (2019.01)

(58) Field of Classification Search
CPC ... G06F 16/128; G06F 16/137; G06F 16/1748
See application file for complete search history.

(56) References Cited

U.S. PATENT DOCUMENTS

2020/0349115 A1* 11/2020 Gupta ................... G06F 16/174

* cited by examiner

*Primary Examiner* — Tyler J Torgrimson
(74) *Attorney, Agent, or Firm* — Staniford Tomita LLP

(57) ABSTRACT

File names and inodes are indexed directly in a filesystem namespace consisting of a layered set of key value store (KVS) database logical tables. The KVS is used directly for organizing file and directory metadata on a cluster file system instead of traditional Btree structures. Embodiments provide file deletion in the file system namespace, and other features include snapshot deletion and cleaning the namespace. A name hash index is used to speed filename lookup in the file system namespace. Two key types of INODE and DIRENT are used to encode namespace metadata using self-identify variable length records in the namespace. Point-in-time snapshot copies are also formalized using KVS database operations as well operations on sets of snapshots for operations including garbage collection and data replication.

20 Claims, 11 Drawing Sheets

100

INTERNET
120

Cluster System
101

APPLICATION SERVER
Deduplicated backup system
112

KVS-Based Namespace Metadata Indexing
118

System Manager
102

MANAGEMENT AND DATA NETWORK 110

NODE 1        NODE 2        . . .        NODE N

114

DATA STORE

108

100

INTERNET
120

Cluster System
101

APPLICATION SERVER
Deduplicated backup system
112

KVS-Based Namespace Metadata Indexing
118

System Manager
102

MANAGEMENT AND DATA NETWORK   110

NODE 1

NODE 2

. . .

NODE N

114
DATA STORE

108

300

400

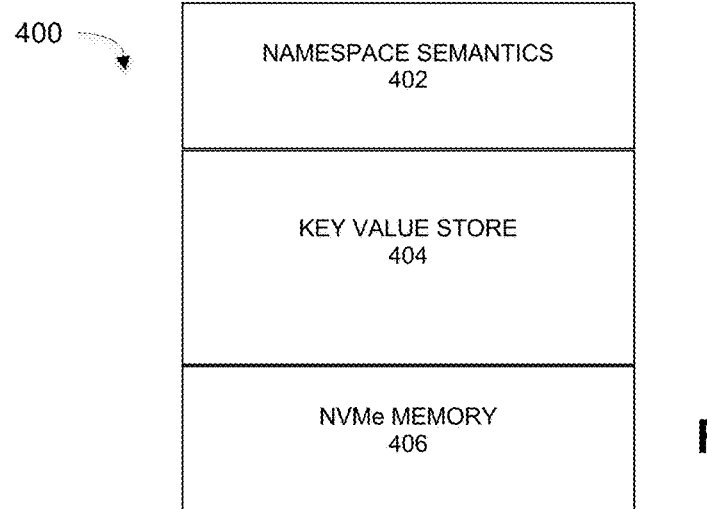

NAMESPACE SEMANTICS
402

KEY VALUE STORE
404

NVMe MEMORY
406

| Term | Acronym | Identifier | Purpose |
|---|---|---|---|
| Logical-Table-Group | LTG | LTGID | File-sets (Mtrees) including snapshots |
| Logical-Table | LT | LTID | Snapshots |

| File System ID   (FSID) | | File ID   (FID) | |
|---|---|---|---|
| Mtree ID (MID) | Snapshot ID (SID) | Parent ID (PID) | Child ID (CID) |

FIG. 5B

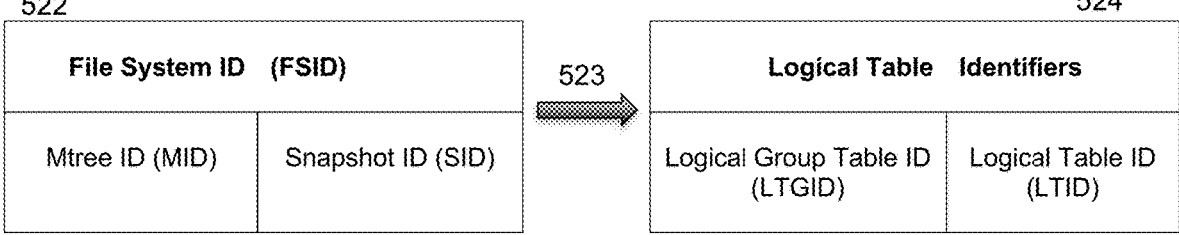

522

524

| File System ID   (FSID) | | | Logical Table   Identifiers | |
|---|---|---|---|---|
| Mtree ID (MID) | Snapshot ID (SID) | 523 ⟹ | Logical Group Table ID (LTGID) | Logical Table ID (LTID) |

802   INODE Key

| FID | TYPE | HASH |
|---|---|---|
| Parent ID: Child ID | INODE | Hash of FID |

804   INODE Value

| Field | Size/Contents |
|---|---|
| Version | 16 bits |
| Type | INODE |
| Size | Varies |
| Checksum | Adler-32 |
| Table ID | ID of table containing this object |
| Metadata | ownership, create/modify/access time, sotrage location, backpointers, etc |

900

902    DIRENT Key

| FID | TYPE |
|-----|------|
| Parent ID: Name Hash | DIRENT |

904    DIRENT Value

| Field | Size/Contents |
|-------|---------------|
| Version | 16 bits |
| Type | DIRENT |
| Size | Varies |
| Checksum | Adler-32 |
| Table ID | ID of table containing this object |
| Metadata | names of file as a string and pid:cid of its inode, and status of this name |

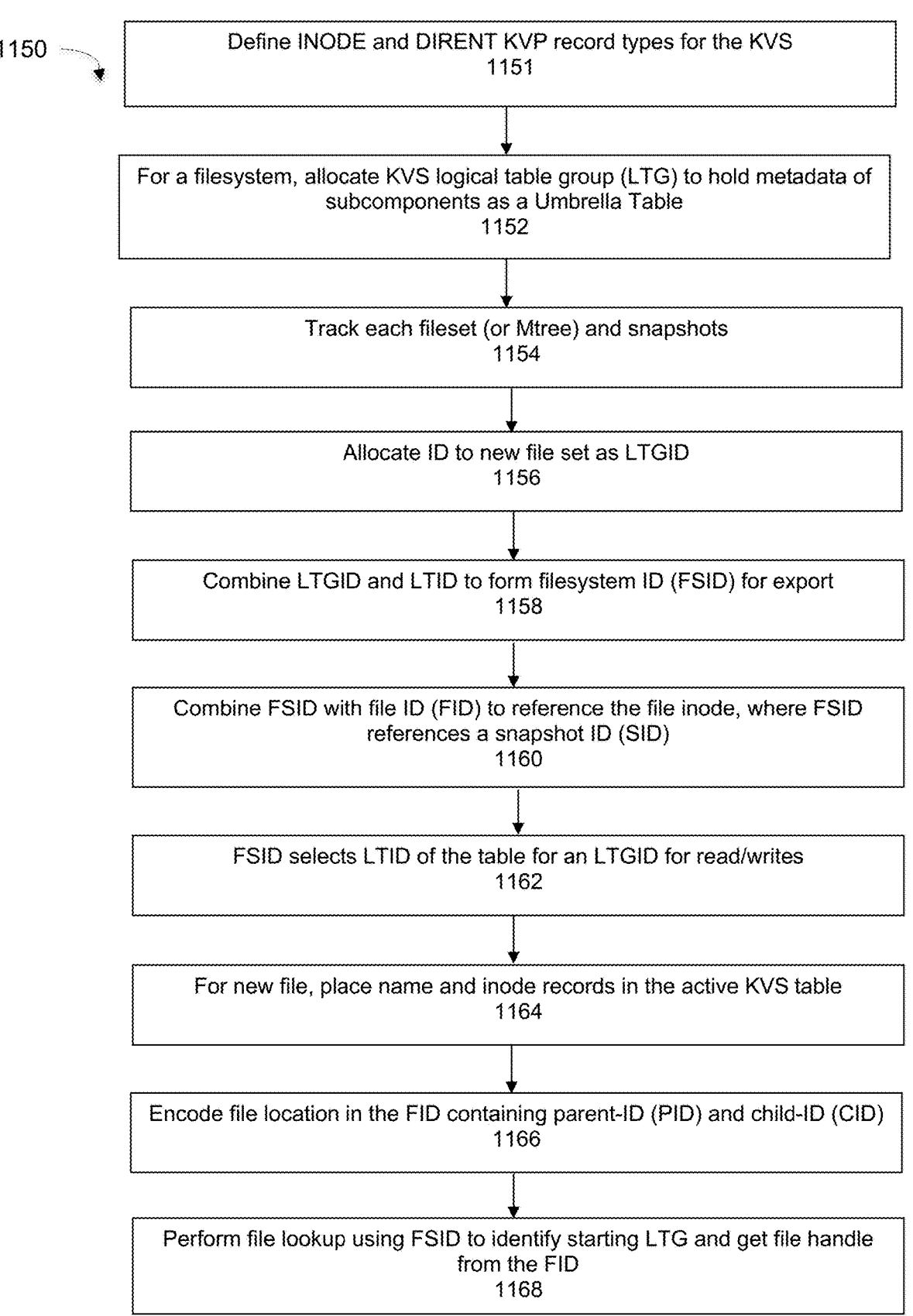

1150

Define INODE and DIRENT KVP record types for the KVS
1151

For a filesystem, allocate KVS logical table group (LTG) to hold metadata of
subcomponents as a Umbrella Table
1152

Track each fileset (or Mtree) and snapshots
1154

Allocate ID to new file set as LTGID
1156

Combine LTGID and LTID to form filesystem ID (FSID) for export
1158

Combine FSID with file ID (FID) to reference the file inode, where FSID
references a snapshot ID (SID)
1160

FSID selects LTID of the table for an LTGID for read/writes
1162

For new file, place name and inode records in the active KVS table
1164

Encode file location in the FID containing parent-ID (PID) and child-ID (CID)
1166

Perform file lookup using FSID to identify starting LTG and get file handle
from the FID
1168

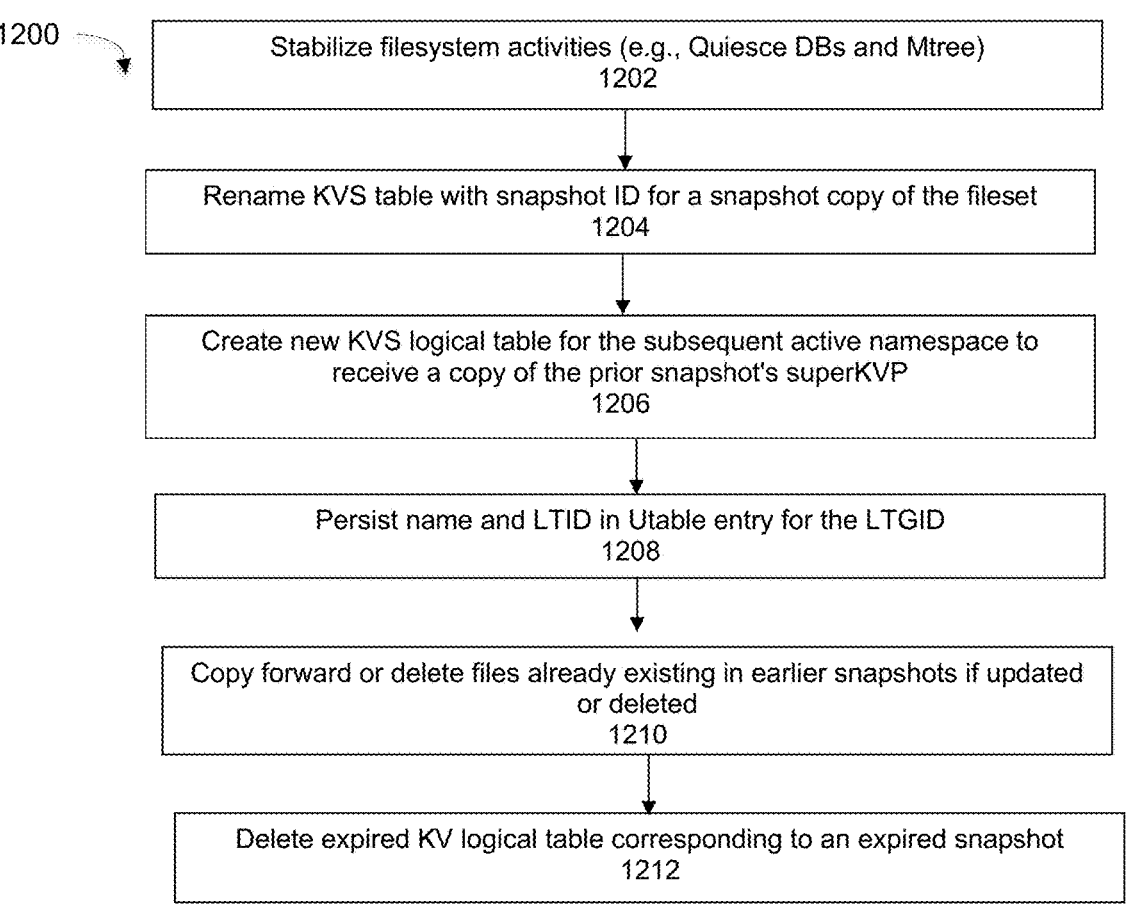

Stabilize filesystem activities (e.g., Quiesce DBs and Mtree)
1202

Rename KVS table with snapshot ID for a snapshot copy of the fileset
1204

Create new KVS logical table for the subsequent active namespace to
receive a copy of the prior snapshot's superKVP
1206

Persist name and LTID in Utable entry for the LTGID
1208

Copy forward or delete files already existing in earlier snapshots if updated
or deleted
1210

Delete expired KV logical table corresponding to an expired snapshot
1212

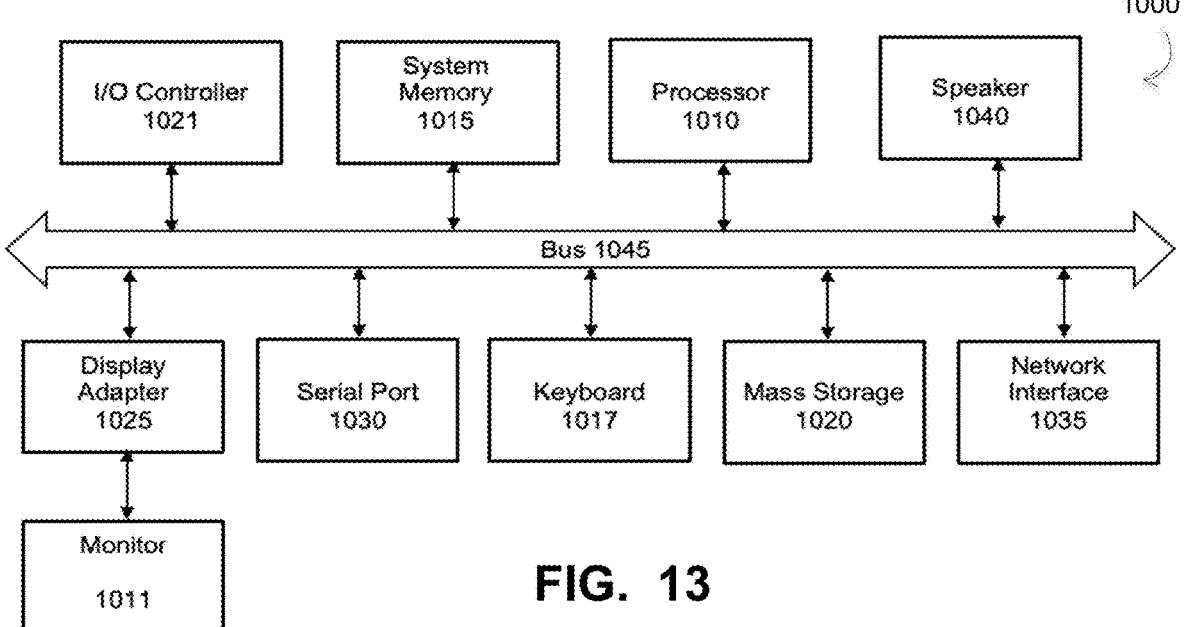

| I/O Controller 1021 | System Memory 1015 | Processor 1010 | Speaker 1040 |

Bus 1045

| Display Adapter 1025 | Serial Port 1030 | Keyboard 1017 | Mass Storage 1020 | Network Interface 1035 |

Monitor
1011

FIG. 13

SNAPSHOT OPERATIONS THROUGH NAMESPACE METADATA INDEXING USING A KEY VALUE STORE ON A CLUSTER FILESYSTEM

CROSS-REFERENCE TO RELATED APPLICATIONS

The present application is related to the following U.S. Patent Applications: 19/035,651 filed on Jan. 23, 2025 and entitled "Namespace Metadata Indexing Using a Key Value Store on a Cluster Filesystem," Ser. No. 19/037,957 filed on Jan. 27, 2025 and entitled "Fileset Replication Through Namespace Metadata Indexing Using a Key Value Store on a Cluster Filesystem," and 19/038,059 filed on Jan. 27, 2025 and entitled "Garbage Collection Through Namespace Metadata Indexing Using a Key Value Store on a Cluster Filesystem," which are each assigned to the assignee of the present application.

TECHNICAL FIELD

Embodiments are directed to distributed networks, and more specifically to using a key-value store to implement metadata indexing in a cluster file system namespace.

BACKGROUND

A distributed or cluster file system is a file system that allows access to files from multiple hosts through a computer network, thus allowing multiple users on multiple machines to share files and storage resources. Cluster file systems have the advantage of being able to increase their capacity and capability through the incremental addition of compute and storage resources on a local area network. This is distinct from traditional file systems, such as the Linux EXT3 or Windows NTFS, that run on a single computer (or "node"), and maintain local namespaces.

All filesystems maintain metadata for the files such as file names, ownership, creation time, and other related information in a component known as the namespace. The namespace provides a hierarchical view of named directories, files, and their associated attributes. The namespace in most modern file systems map the name of a file to a data structure called an inode (INODE), which encapsulates metadata on that file. Traditionally B+Trees have been used for indexing inodes and connecting them with filenames and directories. Such tree-based structures provide a convenient mechanism for finding, adding, and removing individual files and performing large-scale operations on sets of file including enumeration, garbage collection, and file compares. B+ Trees however have several limitations that become exposed on more complex files systems, such as cluster file systems. For example, in cluster file systems such trees can be slow and easily corrupted due to the complexity of maintaining coherence in these structures between nodes.

What is needed, therefore, is a system that operates without B+ Trees, such as by using a key-value store (KVS) directly for organizing file and directory metadata on a cluster file system in order to improve namespace scalability and resilience.

The subject matter discussed in the background section should not be assumed to be prior art merely as a result of its mention in the background section. Similarly, a problem mentioned in the background section or associated with the subject matter of the background section should not be assumed to have been previously recognized in the prior art.

The subject matter in the background section merely represents different approaches, which in and of themselves may also be inventions. Dell, EMC, and Data Domain are trademarks of Dell Technologies, Inc.

BRIEF SUMMARY OF EMBODIMENTS

File names and inodes are indexed directly in a filesystem namespace consisting of a layered set of key value store (KVS) database logical tables. The system uses the KVS directly to organize file and directory metadata on a cluster file system instead of traditional Btree structures. The system utilizes high performance NVMe devices for storage.

Embodiments provide a method for processing file deletion in the file system namespace consisting of a layered set of KVS database logical tables. Other enabled features include snapshot deletion and cleaning the namespace. An INODE index is used to speed lookup in a file system namespace implemented as a layered set of KVS database logical tables. A name hash index is used to speed filename lookup in the file system namespace. Two key types of INODE and DIRENT are used to encode namespace metadata using self-identify variable length records in the file system namespace.

Point-in-time snapshot copies are also formalized using KVS database operations as well operations on sets of snapshots for operations such as garbage collection and data replication.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 4 illustrates main components of a KVS-based namespace metadata indexing system, under some embodiments.

FIG. 5A is a table that shows characteristics of a logical table group and logical table, under an example embodiment FIG. 5B illustrates a file handle layout using DDFS semantics for a KVS system, under an example embodiment.

FIG. 5C illustrates an file system ID to logical table group ID mapping, under an example embodiment.

FIG. 9 are tables that list the key and value components of the DIRENT KVP, under some embodiments.

FIG. 11 is a flowchart illustrating an overall method of using a KVS for namespace metadata indexing, under some embodiments.

FIG. 12 is a flowchart that illustrates a method of creating and deleting snapshots using the KVS-based namespace metadata indexing process, under some embodiments.

FIG. 13 is a block diagram of a computer system used to execute one or more software components of a namespace metadata indexing process, under some embodiments.

DETAILED DESCRIPTION

A detailed description of one or more embodiments is provided below along with accompanying figures that illustrate the principles of the described embodiments, and it should be understood that aspects are not limited to any one embodiment. On the contrary, the scope is limited only by the claims and embodiments encompass numerous alternatives, modifications, and equivalents. For the purpose of example, numerous specific details are set forth in the following description in order to provide a thorough understanding of the described embodiments, which may be practiced according to the claims without some or all of these specific details. For clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus, or device for storing information.

Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the described processing steps. In general, the order of the steps of disclosed processes may be altered within the scope of the described embodiments.

Figure 1:
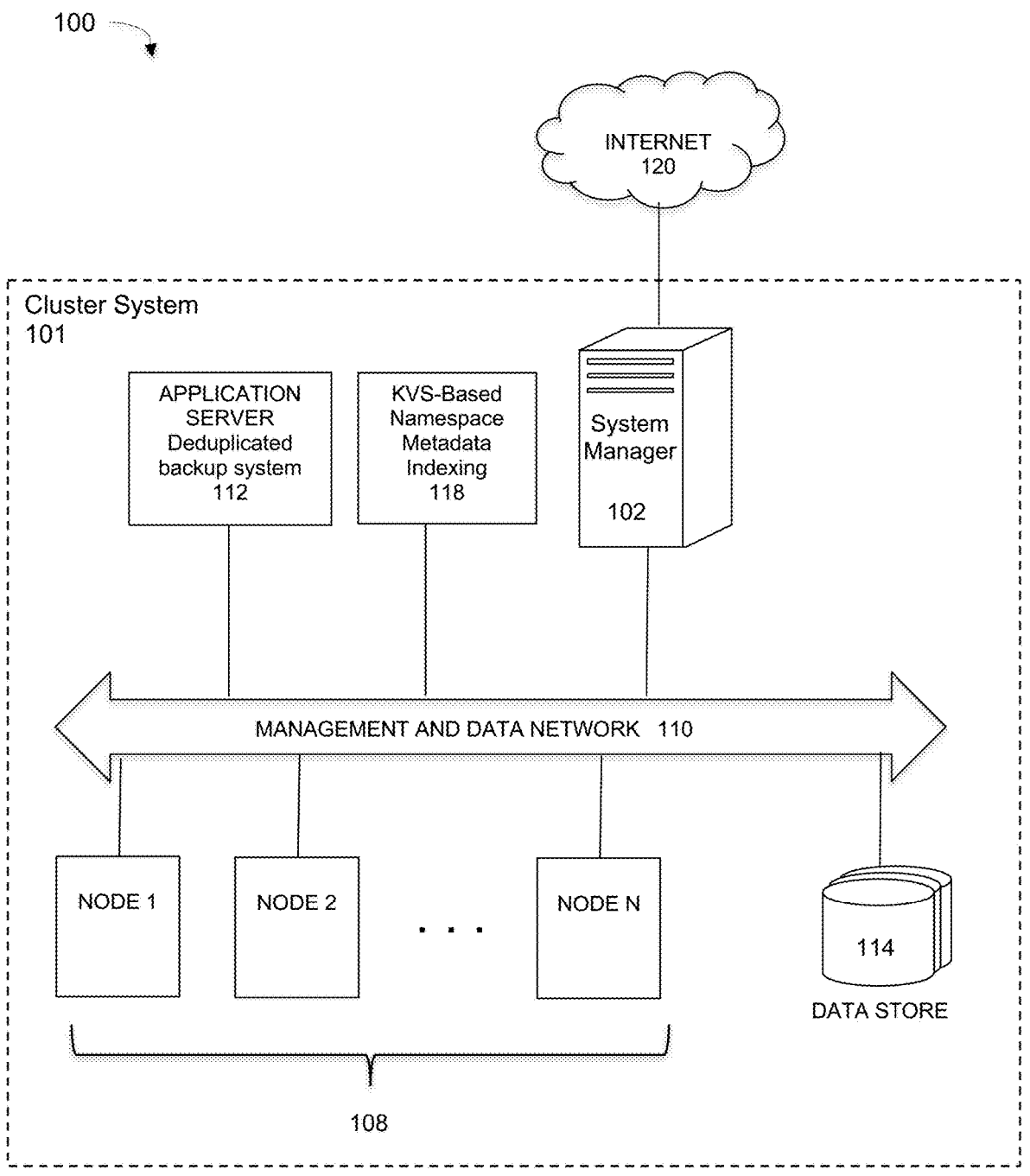
FIG. 1 illustrates a cluster or distributed network system that implements a namespace metadata indexing process, under some embodiments.

Embodiments are directed to systems and methods for implementing namespace metadata indexing using a key value store in cluster network file systems. FIG. 1 is a block diagram illustrating a deduplicated backup system in a cluster network implementing a namespace metadata indexing process, under some embodiments. System 100 comprises a large-scale network that includes a cluster network 101 having a number of different devices, such as server or client computers 102, nodes 108, storage devices 114, and other similar devices or computing resources. Other networks may be included in system 100 including local area network (LAN) or cloud networks, and virtual machine (VM) storage or VM clusters. These devices and network resources may be connected to a central network, such as a data and management network 110 that itself may contain a number of different computing resources (e.g., computers, interface devices, and so on). FIG. 1 is intended to be an example of a representative system implementing a distributed computing system under some embodiments, and many other topographies and combinations of network elements are also possible.

A cluster system 101 (also referred to as a distributed or clustered system) typically consists of various components (and processes) that run in different computer systems (also called nodes) that are connected to each other. These components communicate with each other over the network via messages and based on the message content, they perform certain acts like reading data from the disk into memory, writing data stored in memory to the disk, perform some computation (CPU), sending another network message to the same or a different set of components and so on. These acts (or component actions) are executed in time order by the associated component to constitute a distributed operation.

A cluster system may comprise any practical number of compute nodes 108. For system 100, n nodes 108 denoted Node 1 to Node N are coupled to each other and a system or connection manager 102 through network 110. The connection manager can control automatic failover for high-availability clusters, monitor client connections and direct requests to appropriate servers, act as a proxy, prioritize connections, and other similar tasks.

In an embodiment, cluster system 101 may be implemented as a Santorini cluster that supports applications such as a data backup management application that coordinates or manages the backup of data from one or more data sources, such as other servers/clients to storage devices, such as network storage 114 and/or virtual storage devices, or other data centers. The data generated or sourced by system 100 may be stored in any number of persistent storage locations and devices, such as local client or server storage. The storage devices represent protection storage devices that serve to protect the system data through applications 104, such as a backup process that facilitates the backup of this data to the storage devices of the network, such as network storage 114, which may at least be partially implemented through storage device arrays, such as RAID (redundant array of independent disks) components. The data backup system may comprise a Data Domain system, in which case the cluster system 101 supports various related filesystem and data managers, such as PPDM, as well as services such as object storage and other services.

In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays for use by a backup server, such as a server that may be running Networker or Avamar data protection software backing up to Data Domain protection storage, such as provided by Dell Technologies, Inc.

Cluster system 101 includes a network 110, and also provides connectivity to other systems and components, such Internet 120 connectivity. The network or networks may be implemented using protocols such as Transmission Control Protocol (TCP) and/or Internet Protocol (IP), well known in the relevant arts. In a cloud computing environment, the applications, servers and data are maintained and provided through a centralized cloud computing platform.

In an embodiment, system 100 uses Kubernetes as an orchestration framework for clustering the nodes 1 to N in FIG. 1. Containerization is an OS-level virtualization method for deploying and running distributed applications without launching an entire VM for each application. Instead, multiple isolated systems are run on a single control host and access a single kernel. The containers hold the components such as files, environment variables and libraries necessary to run the desired software to place less strain on the overall resources available. Containerization technology involves encapsulating an application in a container with its own operating environment, and the well-established Docker program then deploys these as portable, self-sufficient structures.

As shown in FIG. 1, network 101 includes a server 112 executing application programs, such as a deduplicated backup system. Such a server can be used to implement a Data Domain process that uses object storage (e.g., Dell ObjectScale), Kubernetes, and different types of storage media, such as HDD, Flash memory, SSD memory, and so on. In an embodiment, a PowerProtect Data Manager (PPDM) microservices layer builds on the Data Domain system to provide data protection capabilities for VM image backups and Kubernetes workloads.

In an embodiment, cluster network 101 may be implemented as a Santorini cluster. Santorini is an integrated scale out software solution developed by Dell Technologies that can run on-premises or in a public cloud. The Santorini file system stores the file system metadata on a distributed key value store and the file data on object store. It exposes a global namespace that is a union of all namespaces in all domains. Distributed key value (KV) stores are also a component of Santorini and are used to hold much of the metadata such as the namespace Btree, the Lp tree, fingerprint index, and storage container fingerprints.

The Data Domain File System (DDFS) from DellEMC is an example filesystem in which the filesystem anchors and segments data as it is ingested. The filesystem keeps track of segments which are stored on the disk, and if the segments are accessed again, the filesystem just stores a reference to the original data segment that was written to disk. A file is therefore a stream of segments, and these segments are uniquely identified by a key/label data element, called a fingerprint. Given a file offset and length, the corresponding data segment fingerprints need to be looked up to access the actual data.

In a filesystem that forms segments from data, these segments are uniquely identified by their key/label called as fingerprint. Given a file offset and length, the corresponding data segment fingerprints need to be looked up. To provide faster offset to fingerprint lookup the mapping in present systems can be stored in a Merkle tree format where the leaf nodes represent data segments and their fingerprints are stored in the parent nodes which are metadata segments. In a Merkle tree, every non-leaf node is labeled with the hash of the labels of its children nodes to allow efficient and secure verification of the contents of large data structures.

Figure 2:
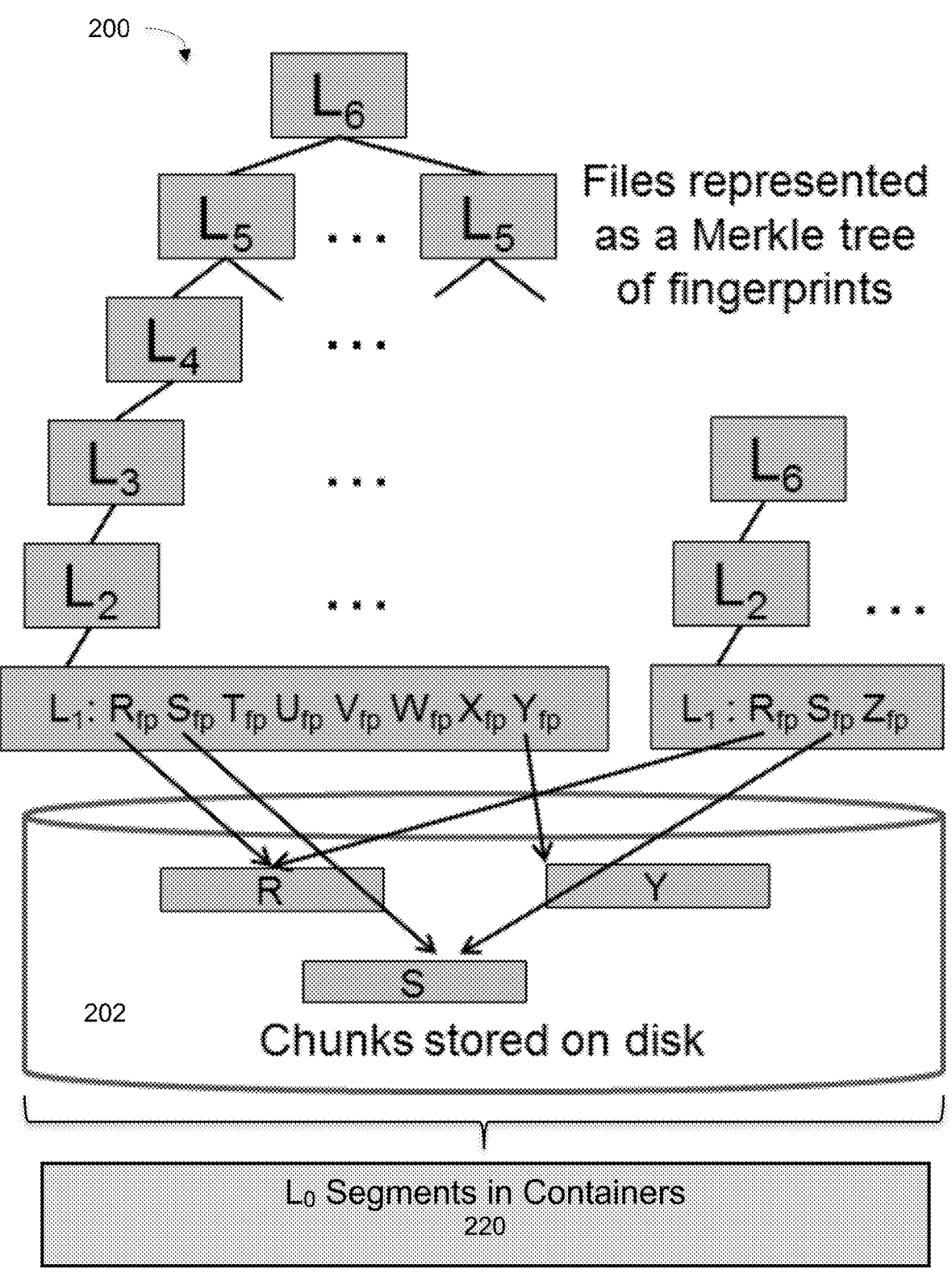
FIG. 2 levels of data abstraction in a Data Domain system including MTrees used for data deduplication, under some embodiments.

FIG. 2 illustrates files an example Merkle tree representation of files in a deduplication backup system, under some embodiments. A file in DDFS is represented by a Merkle tree with user data as variable sized segments at the bottom level of the tree, referred to as L0 segments. The SHA1 fingerprints of those segments are grouped together at the next higher level of the tree to form new segments, referred to as L1 segments. SHA1 fingerprints of L1 segments are grouped together as L2 segments, and this continues up to L6 which represents the entire file. The top segment of the tree is always an L6 segment, even though it may refer to any lower numbered segments. Segments above L0 are referred to as Lp chunks. The L6 segment of every file is stored in a namespace which is represented as a B+ Tree. The L0 and Lp segments are written to separate storage containers, known as L0 and Lp. As shown in FIG. 2, the chunks directly written to disk 202 are referred to as L0, meaning the lowest level of the tree. This data as stored on the disk represents the L0 segments in the storage containers 220.

As data is written into a deduplicated storage system, it is divided into segments (fixed or variable sized) and represented by a fingerprint (fpx). The fingerprint consists of a SHA-1 hash over the segment and possibly other fields such as a segment size, XOR over the bytes, etc. In general, the terms a "SHA-1 fingerprint" or "SHA-2 fingerprint" mean that the hash used in the fingerprint is generated using the SHA-1 or SHA-2 algorithm without specifying what other fields are part of the fingerprint. The fingerprint is a unique identifier for deduplication purposes and is used to identify segments needed to reconstruct a file during a file read (i.e., data recovery). The hash can be calculated immediately after a segment is formed and is used for verifying segment validity later. By recalculating the hash of the data and comparing it to the previously stored hash, a data corruption can be detected if the hashes differ.

With respect to the storage container metadata, after performing deduplication on incoming segments, all remaining segments are stored to persistent storage. They are grouped into buffers, compressed, and packed into a fixed-sized data elements. The storage container size depends on properties of the underlying storage layer and may be aligned to a RAID stripe size or other consistent size used for efficient I/O. As an example, the storage containers in a Santorini system are of 16 MB size to align with the ObjectScale chunk size used for erasure coding. Other similar sizes are also possible, however. A storage container basically comprises a section allocated for compressed data segments, along with a metadata section holding fingerprints and other metadata about the segments in the storage container.

A fingerprint index is used to record where segments are stored in the system. A fingerprint index thus provides a mapping from fingerprints to a data blob or similar data element. Other data structures then map the data to a physical location in storage. A simplified fingerprint index can simply be a mapping from fingerprint to container ID (CID). The fingerprint comprises a hexadecimal number (e.g., 0x01) and container ID (CID) is shown as a decimal value (e.g., 13). However, this may actually be a more complex record with container ID, compression region offset, compression region size, etc. During deduplication and file reads, the fingerprint index is checked to identify whether the fingerprint and its associated segment have been stored, and where the segment is stored.

As stated above, in an embodiment, cluster system 101 implements containerization technology through a Kubernetes implementation. A Docker container is a virtualized computing environment (e.g., OS level VM) to run an application program as a service or microservice, and are lightweight, portable data constructs that are decoupled from the underlying infrastructure. Applications are run by Docker containers as microservices with the container orchestration service facilitating scaling and failover. For example, the container orchestration service can restart containers that fail, replace containers, kill containers that fail to respond to health checks, and will withhold advertising them to clients until they are ready to serve. When used in the context of a Kubernetes system, the term "container" can be taken to mean a Docker container, while the term "storage container" as used herein can be taken to mean a DDFS container.

In an embodiment, system 100 uses Kubernetes as an orchestration framework for clustering the nodes 1 to N in FIG. 1. Application containerization is an operating system level virtualization method for deploying and running distributed applications without launching an entire VM for each application. Instead, multiple isolated systems are run on a single control host and access a single kernel. The application containers hold the components such as files, environment variables and libraries necessary to run the desired software to place less strain on the overall resources available. Containerization technology involves encapsulating an application in a container with its own operating environment, and the well-established Docker program deploys Docker containers as portable, self-sufficient structures that can run on everything from physical computers to VMs, bare-metal servers, cloud clusters, and so on. The Kubernetes system manages containerized applications in a clustered environment to help manage related, distributed components across varied infrastructures. Certain applications, such as multi-sharded databases running in a Kubernetes cluster, spread data over many volumes that are accessed by multiple cluster nodes in parallel.

In Kubernetes, a pod is the smallest deployable data unit that can be created and managed. A pod is a group of one or more containers, with shared storage and resource requirements. Pods are generally ephemeral entities, and when created, are scheduled to run on a node in the cluster. The pod remains on that node until the pod finishes execution.

In an embodiment, system 100 utilizes Kubernetes clusters. One such example network is the Santorini system or architecture, though other similar systems are also possible. Such a system can be used to implement a Data Domain (deduplication backup) process that uses object storage (e.g., Dell ObjectScale), Kubernetes, and different types of storage media, such as HDD, Flash memory, SSD memory, and so on. In an embodiment, a PowerProtect Data Manager (PPDM) microservices layer builds on the Data Domain system to provide data protection capabilities for VM image backups and Kubernetes workloads. Santorini exposes a global namespace that is a union of all namespaces in all domains.

Figure 3:
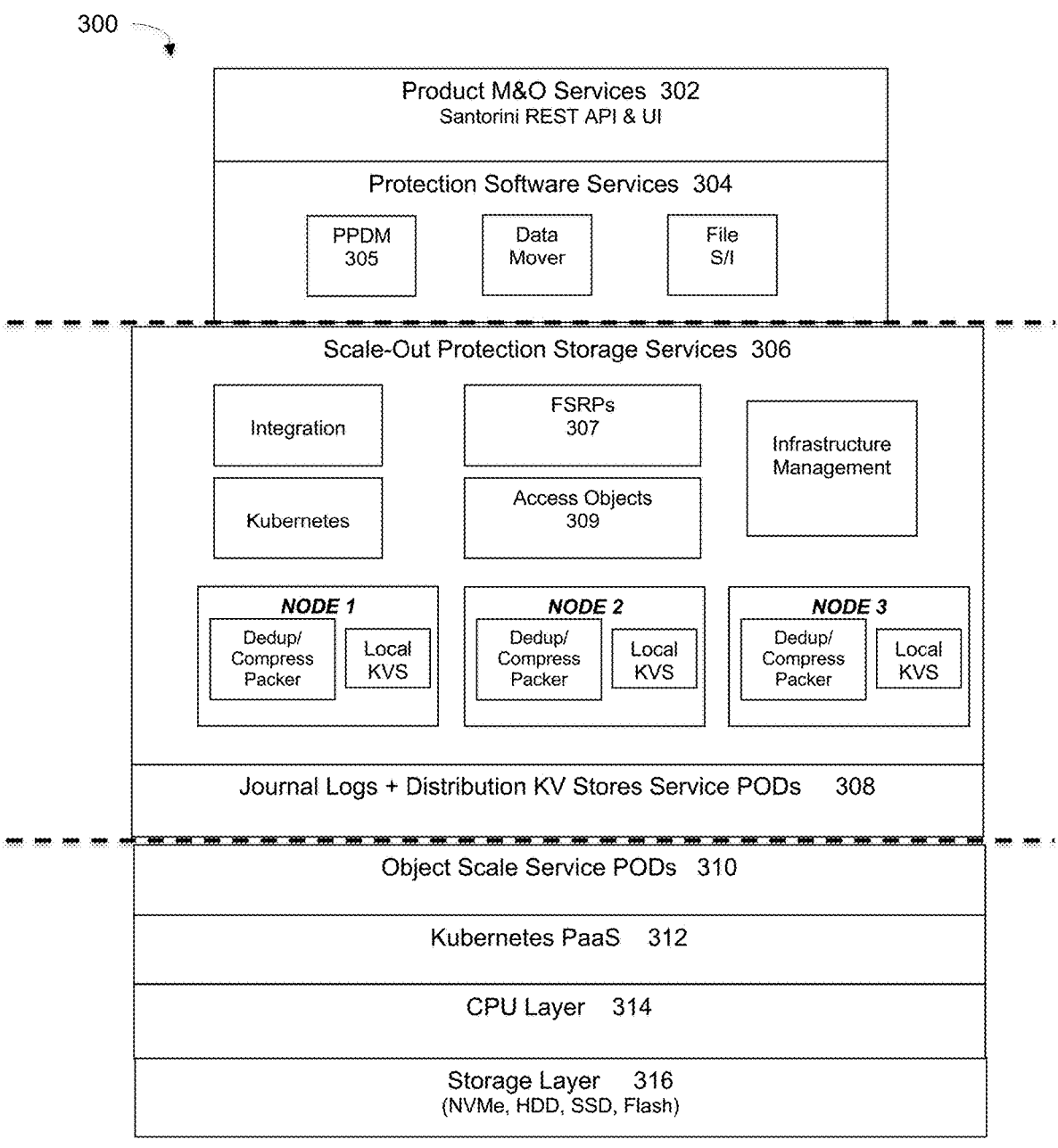
FIG. 3 illustrates an example of some services related to the data path running in Santorini cluster network, under some embodiments.

FIG. 3 illustrates an example of some services related to the data path running in Santorini cluster network, under some embodiments. As shown in diagram 300, a product services layer 302 provides the necessary REST APIs and user interface utilities. The API server implements a RESTful interface, allowing many different tools and libraries can readily communicate with it. A client called kubecfg is packaged along with the server-side tools and can be used from a local computer to interact with the Kubernetes cluster.

Below layer 302, the protection software services layer 304 includes a data manager (e.g., PPDM) component 305 that provides backup software functionality. Within the scale-out protection storage services layer 306, the File System Redirection Proxy (FSRP) service 307 redirects file operations in a consistent manner based on the hash of a file handle, path, or other properties to instance of the access object service 309. The access object service 309 handles protocols and a content store manager. This means that files are segmented and the Lp tree is constructed by an access object 309. The FSRP 307 redirects file system accesses in a consistent way to the access objects 309 so that any in-memory state can be reused if a file is accessed repeatedly in a short time, and it avoids taking global locks.

Also included in this layer 306 are any number of nodes (e.g., Nodes 1 to 3, as shown), each containing a dedup/compression packer and a key-value (KV) store. Other functionality exists in the dedup/compress service such as packing segments into compression regions, containers, and blobs that will be written to an underlying object storage such as provided by the object scale service layer 310. Other layers of system 300 include Kubernetes PaaS (platform as software) 312, a CPU layer 314, and a storage layer 316.

Distributed key value (KV) stores (KVS) are also a component of Santorini and are used to hold much of the metadata such as the namespace Btree, the Lp tree, fingerprint index, and container fingerprints. These run as containers within the Santorini cluster and are stored to low latency media such as NVMe. There is also a distributed and durable log that replaces NVRAM for Santorini.

Many cluster networks distinguish between file metadata and file data and offer some form of snapshot copy function that provides a consistent point-in-time image between those objects. The snapshot process provides a consistent point-in-time image between the metadata and corresponding file data. Replication of data for a backup (e.g., 112) typically involves taking a snapshot of the MTree (logical and physical representations) at different replication points, where a snapshot is a consistent, frozen-in-time logical copy of an MTree.

In some cases of a cluster network, a node may represent an access point, which is a point of access to a filesystem operation, such as looking up files by name and returning a file handle (e.g., pid:cid ID), and then providing read and write access to that file's data. There may be data objects that store the actual file data, and a request goes through the access node to get the file's data which is stored on the data object.

KVS for Namespace Metadata Indexing

In general, the namespace in file systems maintains metadata for file/directory names and associated attributes. In cluster file systems, namespaces enable users to divide cluster resources within the physical cluster among different teams via resource quotas, and are thus useful for complex systems and applications. As described above, B+ Trees, such as shown in FIG. 2 have been used for indexing inodes and connecting them with filenames and directories. In cluster-based filesystems such trees can be slow and easily corrupted due to the complexity of maintaining coherence in these structures between nodes.

Embodiments include a cluster system architecture or processing component 118 that entirely eliminates the need to use B+ Trees by using a key-value store (KVS) directly for organizing file and directory metadata on the cluster file system in order to yield an overall improvement in namespace scalability and resilience.

The traditional B+ Trees used to maintain metadata generally provide a convenient mechanism for finding, adding, and removing individual files and performing large-scale operations on sets of files including enumeration, garbage collection, and comparison between distinct sets of files. As mentioned above, however, B+ Trees however have several limitations that become exposed on cluster file systems. B+ Trees are organized into blocks, also referred to as pages, and are cached in memory and persisted on permanent storage. This page grouping of data was essential when accessing block devices like hard disks (HDDs) that naturally operate on fixed sized chunks of data. Each page for example can contain the metadata of hundreds of files, but this forced grouping is a liability in a cluster file system. These paged structures lead to internal fragmentation and requires compaction to improve space efficiency, and such operations are difficult to coordinate across a cluster. B+ Trees also have a fixed number of levels, with a maximum number of leaf pages, which in turns sets a maximum number of files they can store.

Since the file system must allow for concurrent random access and updates to these pages, maintaining coherence between the in-memory copy and the on-storage structure involves a multi-stage transaction to serialize their data synchronization operations. Cluster file systems must move B+ Tree pages between nodes depending on the nodal access patterns. This results in repeated request-release cycles (referred to as "ping pongs") of various structures between nodes and requires methods to dampen these oscillations. Comparative differencing between snapshots, which is a staple of replication operations, requires extra hints to track versions and carefully walking the trees being compared. B+ Trees thus make file system implementation quite complex, particularly in a cluster file system, and limit their scalability.

Embodiments of system 100 utilize key-value store (KVS) databases along with high-speed NVMe flash memories for data persistence, to eliminate B+ Trees and host a namespace natively on a KVS. For purposes of description, embodiments are described in the context of the Data Domain Filesystem (DDFS) in conjunction with a Santorini cluster file system. It should be noted that although embodiments have been described with respect to cluster and DDFS, it should be noted that embodiments are not so limited and other file systems and applications can also be used.

It should be noted that KVS databases have been around for some time, however, it is only relatively recently that clustered cloud implementations along with a decrease in cost and increase in performance of NVMe flash storage, has made it possible to use a KVS as a general purpose storage platform.

FIG. 4 illustrates main components of a KVS-based namespace metadata indexing system, under some embodiments. System 400 is built on a key value store 404 that stores metadata using cost affordable NVMe storage 406. File system namespace features on a KVS alone is a challenging task, as the complexities of file-name operations, snapshot creation, and various maintenance operations is non-trivial. System 400 of FIG. 4 provides certain mechanisms to support and implement namespace semantics 402 using the KVS and NVMe components.

Non-Volatile Memory Express (NVMe) is a protocol that uses a PCI Express (PCIe) bus to connect solid-state drive (SSD) storage to computers. It provides very high performance through parallel I/O operations with multicore processors, and communicates directly with the host CPU through multiple command queues (e.g., 64K). It features a latency of 2.8 microseconds and can perform over 1 million IOPS. Although traditionally a very expensive type of memory, costs are reducing over time. In an embodiment, the NVMe memory 406 is used to store a high number of small transactions. In present implementations, NVMe is on the order of 10,000 times as fast as hard disks (which do about 100 IOPs). With NVMe flash the system can have a high number of small objects (i.e. Key Value Pair data structures of individual inodes) and access them randomly and still widely outperform HDDs using large sequential transfers (e.g., a 64K Btree page).

The key value store (KVS) 404 (or key value database), associates one piece of data with another, usually referring to the first item as the "key" and the second item as the "value" in date elements such as [key: value]. A key value store represents an associate array, and some programming languages have these associative arrays as a built-in feature, like Perl (hashes) and Python (dictionaries), among others. Although embodiments are described with respect to key value stores, it should be noted that other table or key-based mechanisms may also be used for component 404 in FIG. 4.

In general, KVS is a broad term and the features that are available in each implementation can vary. Many implementations work in a cluster, and some have a built-in snapshot or garbage collection (GC) features, while others do not. The cost of creating a new KV tables may be large depending on implementation details. One area of great variation is in the speed and capability of searching. Some KVS implementations may have generalized wildcard ability, while others are more limited. Embodiments of KVS 404 provide cluster implementation and need to provide some GC operations. To address the varying costs of table creation and scope of search capabilities, the tables are a group of logical-tables (LTs), that can be implemented as individual physical tables, or as a single table where partitions are made in the key-space through the addition of a prefix to select a specific logical-table.

Unlike B+ Trees, a KVS provides an inherent indexing structure. In system 400, KVS 404 maps file system objects onto a set of key-value pair (KVP) records. These KVP records are then directly stored into a KVS logical-table without packing them into any kind blocking or indexing structure, such as is needed for the tree structure of FIG. 3. The "value" portion of these records are self-identifying data objects of variable length providing both flexibility and improved recoverability capabilities. Each underlying KVS logical-table that is accessed provides the physical boundary of metadata modified in each period (i.e., a snapshot copy). One or more of such logical-tables grouped together provide the full logical boundary of a complete set of files, referred to as a fileset generically, or an Mtree in DDFS systems. Thus, a filesystem namespace is built up from a group of point-in-time (or snapshot) copies plus a live logical-table for active creation and modification of files.

This embodiment provides several benefits such as eliminating the need to deal with the complexities of compacting Btree page structures. Transactions are reduced in size from those found in page-based implementations. In-core namespace caches, no longer being page based, can cache orders of magnitude larger number of individual inode records thereby improving cache granularity and more than compensating for any increased requirements in storage or compute resources. By using smaller and finer grained namespace objects that have fewer dependencies between them the scalability of the system is increased as well as overall resiliency and throughput.

Embodiments use the KVS 404 as a fundamental data-persistence mechanism and implement a "logical-table" as an abstraction of a basic unit can be implemented differently depending on the capabilities of the KVS implementation that is chosen. The namespace for a file set in this design consists of an active KVS logical-table where new files are created, read, updated, or deleted, and along with it a set of zero or more logical-tables representing point-in-time copies (snapshots) of prior instances of that namespace. Looking up a file involves checking in the active logical-table, and then backwards in time through the earlier snapshots using either an iterative per-table method or a wildcard search of all the layers, depending on the capabilities of the KVS implementation chosen. Both in-core and persistent caches can be used to speed those operations.

Creation of a new file involves writing a record to the active logical-table only, while updating any file record in the active logical-table just modifies the existing record for that file in that logical-table. Updating any file record from a prior snapshot involves a copy-on-write operation that places a modified version of that file record in the active logical-table. When a file is deleted, it is marked-deleted but remains in the logical-table, but it is not publicly visible. Similarly, snapshots can be deleted making them no longer publicly visible, but they will continue to reside in the database until one or more GC operations have removed all of their elements. The comparison (i.e., differencing or "diffing") of snapshots common during enumeration and replication operations is obviated in most cases since each logical-table is a full expression of the changes (i.e., delta data) from the prior one.

In an embodiment, the logical table abstraction is used to translate namespace semantics 402 into KVS operations. In this manner, any appropriate file system may be used for overall cluster system 100. A logical-table-group implements a file system namespace, and comprises a set of one or more logical-tables, with each representing the view of that namespace at a particular point in time. FIG. 5A is a table 500 that shows characteristics of a logical table group and logical table, under an example embodiment. For the example of FIG. 5A, a logical table group (LTG) has a unique identifier (LTGID) and purpose or composition (e.g., file sets). Likewise, a logical table (LT) has an identifier (LTID) and composition (e.g., snapshot copies).

For each file system, a KVS logical table group is allocated as the holder of metadata on all its subcomponents and is referred to as the Umbrella-Table (Utable). The Utable tracks the name of each file set (Mtrees in DDFS usage) as well as their snapshot copies. When a new Mtree is created, an ID is allocated and will be used as the LTGID of the logical table group that is formed. The first active logical table is allocated and the equivalent of the familiar file system "superblock," the super-KVP (SKVP), is initialized. The LTGID and LTID taken together from the filesystem-ID (FSID) that is exported to external users. This information is registered in the Utable, including the initial name of that Mtree.

This KVS keying system aligns with traditional file handle semantics that combines a FSID with a file ID (FID) to reference a file's inode. The FSID combines the fileset identifier (e.g., an Mtree ID in DDFS) along with a reference to a snapshot-ID (SID), where a SID of 0 indicates the active Mtree. FIG. 5B illustrates a file handle layout using DDFS semantics for a KVS system, under an example embodiment. Table 510 of FIG. 5B lists the file system ID (FSID), which comprises an Mtree ID (MID) and a snapshot ID (SID) for a file having file ID (FID) based on a parent ID (PID) and child ID (CID).

Each FSID selects the logical table ID (LTID) of the table to access in that LTGID when reading and writing files. FIG. 5C illustrates a file system ID to logical table group ID mapping, under an example embodiment. As shown in FIG. 5C, an FSID of table 522 having an Mtree ID and snapshot ID is mapped 523 to the logical table identifiers 4 of LTGID and LTID.

Figures 6, 7:
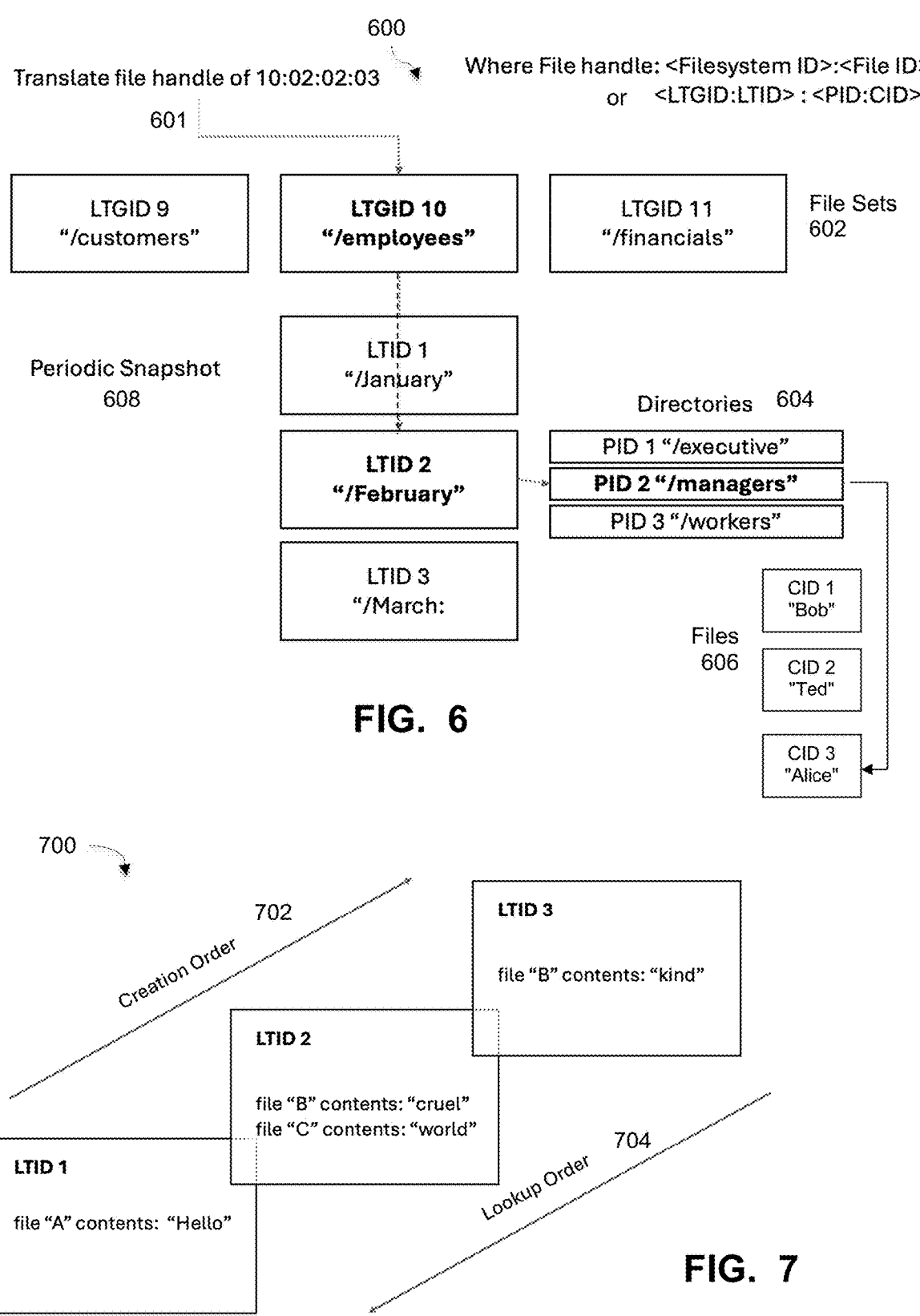
FIG. 6 shows how a file handle encodes the file set, snapshot, directory and identity of a single file by searching a set of separate KVS tables, under an example embodiment.
FIG. 7 shows a relationship between separate logical tables and their file metadata and data contents, under an example embodiment.

FIG. 6 shows how the file handle encodes the file set, snapshot, directory and identity of a single file by searching a set of separate KVS tables, under an example embodiment. FIG. 6 illustrates a directory tree 600 comprising file sets 602 containing directories 604 that hold certain files 606 saved by periodic snapshots 608. To find a particular file specified by a file handle 601, the system utilizes the <LTGID: LTID>:<PID:CID>key value pair utilized by the KVS 404. This replaces the usual <Filesystem ID>:<File ID> key value pair in other systems. For the example of FIG. 6, the translation for file handle (e.g., 10:02:02:03) points to LTGID 10 and LTID2 with PID 2 and CID 3 to yield the file "Alice" as the resulting file. FIG. 6 illustrates how KVS databases with a robust wildcard search capability can eliminate the need to allocate separate physical tables for each LTID.

FIG. 7 shows the relationship between separate logical tables and their file metadata and data contents, under an example embodiment. As shown in diagram 700, three logical tables, LTID 1, LTID 2, and LTID 3 are pictured as created in that order, 702. LTID 1 contains one file, named "A" and with the data contents of "Hello." LTID 2 contains two files, "B" which contains "cruel" and "C" which contains "world." LTID 3 contains one file, file "B" which is also referenced in LTID 2, but here the contents of that file is the string "kind." If looking for files A, B, and C from LTID 2, all three will be found with their respective contents being "Hello", "cruel", "world." However, if all three files are looked up according to lookup order 704 from LTID 3 to LTID 1, all three files will be found, but the respective contents would be "Hello kind world".

As directories and files are created, name and inode records are placed in the active KVS table for that Mtree. These records are updated when the metadata for each file is modified. This includes information on file ownership, access permissions, modification times and the location of that file's actual data in persistent storage. All these operations can be protected by crash recoverable transaction mechanisms as per normal practice.

File IDs are unique to a LTG and are monotonically increasing, with the running count stored in the super_kvp. Each new file has an FID that contains a parent-ID (PID) and a child-ID (CID) to encode the directory where a file resides and the file itself. In the KVS, the key layout of for the file ID can thus be given as: FID=[PID: CID].

In an embodiment, the KVS has key value pairs (KVPs) that are of two types: the INODE record that stores metadata, and the DIRENT record that stores the name of the file. Additional record types can be added, but embodiments are described with respect to these two types. All of the namespace semantics 402 that are needed by the system can be built up from the INODE and DIRENT KVPs.

In general, all of the namespace semantics 402 can be built or derived from the INODE and DIRENT records. The KVS using these KVP types is scalable through variable size structures since the INODE can have pointers and back pointers to any number of names.

The INODE and DIRENT are the two fundamental KVP record types that are needed to implement generic namespace semantics 402. The INODE contains all the requirement metadata of an individual file, including its creation and modification time, ownership, and pointer to its actual physical file data (the content handle, CH), but it does not hold the file's actual name. The DIRENT contains the actual name of a given file or directory. Every file (inode) has one or more DIRENTs associated with it, since files in Posix semantics can have more than one name. For example, the root directory of a hierarchical filesystem namespace is indicated as "/", so there is a DIRENT that contains the "/" and that points to the inode for that directory (usually starting with a fixed number, like "16" in DDFS). There may also be a directory named ".", which also points to the "/" inode, and " . . . " which points to the parent directory, which in this case being root points back to itself. Thus "/" has three names "/", ".", and " . . . ", each of which are separate DIRENTs, and all of which reference inode 16 (the default value of the root inode). The root directory itself may contain files or other directories, and each of these will have a DIRENT and a pointer an inode. The inode key is PID: CID, so a file "/a", where is the first file created in that directory would have a key of 16:17. The DIRENT for "a" is PID:NAME_HASH, and so it might be something like 16:0x3E59F201, where the name hash algorithm converts the string "a" into a 32 bit number. Looking up the name by hash avoids doing a linear search of the directory to find a given name. The system can simply take a hash of the name being accessed and then do a KVS lookup on that precise key. Though hash collisions may occur when an entirely different name might hash to the same value, this is very rare, and in that case the DIRENT contains all the names that have the same hash value, so once that KVP is read it is necessary to scan the entire KVP and find the matching name. DIRENTs therefore need to be variable side from the outset to handle hash collisions.

Compared to block-based schemes, making record types such as this variable in size is much more natural in a KVS system, so adding ancillary information to each of these types is straightforward. The INODE KVP has a unique FID where its PID indicates the directory where it was created, and a CID that refers uniquely to itself. DIRENTs use the same PID, but their CID field is set to a hash to the file name they represent.

With respect to INODE records, the metadata associated with an inode resides in the "value" portion of its KVS element and may contain multiple records, such as a pointer to indirect blocks, content handle (CH), permissions, file or directory name, hash for look up, auxiliary/extended attributes, and so on. The directory for an inode follows a similar structure, but usually does not associate it with it any other data persistence, except for whatever metadata is stored in its KVS value portion. Each INODE record also contains a back pointer to the DIRENT records that assign to it a name, providing for those that have multiple names (e.g., "hard links").

A self-identifying feature of the INODE and DIRENT structures means that they have a header that defines their type and version and includes the KVS key that is used to reference them as well as a checksum for their entire contents In the event of corruption of a KVS table, the individual items when extracted can be used to reconstruct the database in whole or in part.

Figure 8:
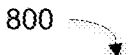
FIG. 8 are tables that list the key and value components of the INODE KVP, under some embodiments.

FIG. 8 are tables that list the key and value components of the INODE KVP, under some embodiments. Table 802 lists the Key portion of the INODE KVP and comprises the FID, Type, and Hash of the FID. The FID (file ID) specifies the parent ID and child ID, the type is INODE, and the Hash is a value used for a random data to enhance security. This could be a file handle salt, which is a random string of characters added to a file handle to preventing potential attacks that try to exploit the predictability of standard file handles.

Table 804 lists the Value portion of the INODE KVP, and can comprise fields including version, type, size, checksum, table ID, and the metadata, as shown. FIG. 8 is provided for purposes of illustration, and other fields and values can also be used.

The DIRENT record combines the function of the case-insensitive hash records and the directory entry records, such as used in DDFS and similar file systems. Combining these functions requires that, in response to certain directory listing requests, the output must be sorted prior to returning it to the user. It is possible, though rare, that different file names can hash to the same hash bucket, so the DIRENT records can store the names of more than one file in a directory. The DIRENT thus essentially constitutes a hash-bucket for file names, holding their literal string file name and their pointer to their respective INODE record.

FIG. 9 are tables that list the key and value components of the DIRENT KVP, under some embodiments. Table 902 lists the Key portion of the DIRENT KVP and comprises the FID and Type, where the FID (file ID) specifies the parent ID and the file name hash, and the type is DIRENT.

Table 904 lists the Value portion of the INODE KVP, and can comprise fields including version, type, size, checksum, table ID, and the metadata, as shown. In this case, the metadata comprises one or more names of the file as a text string, and the PID: CID of its INODE, as well as the status (alive or dead) of this name. FIG. 9 is provided for purposes of illustration, and other fields and values can also be used.

To create a file with a given name in a directory, first the directory name is looked up. If it is found an error is returned otherwise the ID of the destination directory is used to form the PID (Parent ID) that will be used in the next step. Then new file ID is allocated (updating the next_fileID variable in the SKVP) which serves as the CID which will be used to form the key for the INODE, and a hash is calculated. Now the INODE structure can be initialized and it can be stored with the key <pid:cid:INODE:salt>. Next the DIRENT structure is formed that contains the name of the file and key of the INODE just created, and hash of the file is calculated It is stored with <pid:name_hash:DIRENT:hash>. The statistics in the parent directory INODE is updated accordingly.

When a file is updated for the first time since a snapshot was created, its INODE record and its associated DIRENT records are copied to the active logical table where it is the updated with most recent information (i.e., modified file attributes, location of actual file data).

The FSID in the lookup request allows us for quick identification of the starting LTG (i.e., Mtree) and its active LT (i.e., snapshot). The FID portion in the file handle provides for the specific file being requested, and a KVS key is formed of type INODE. Then a set of KVS gets will be performed on the specified snapshot and its ancestors going back to the last persistent cache in parallel. An error is returned if the file is not found.

A file name lookup operation assumes a starting directory, usually "/" in the specified Mtree, that has a predefined file-ID. That will form the pid field in the lookup key. Then the name of the file is used to compute a 32-bit hash value (name hash) which is used to form the cid, of the lookup key. The name hash is calculated in forming the key, and is used directly to look up the DIRENT. The file look up occurs in parallel on a current table and its ancestors where logical-tables are implemented as physical tables. For KVS implementation a wildcard search is performed to search the table at once. More than one match may be found due to the possibility of the hash collision and the entries in the DIRENT will be examined. If a match is found success is returned to the user. If it is not found a "not found" error is returned to the user.

File deletion is proceeds first with a lookup as mentioned above. Once the file is found the reference count in the INODE is decremented (since it can have more than one name, i.e., "hard links") and if it is zero the INODE is marked deleted. The DIRENT for that file is also marked deleted but is kept around until GC runs.

Locating a file in the system involves identifying the appropriate directory path for the file. Generally, all name look ups proceed recursively along a path. For example, a path like:/a/b/c first finds "a" in the root directory, then finds "b" in the/a directory, and then finds "c" in directory "b."

Figure 10A:
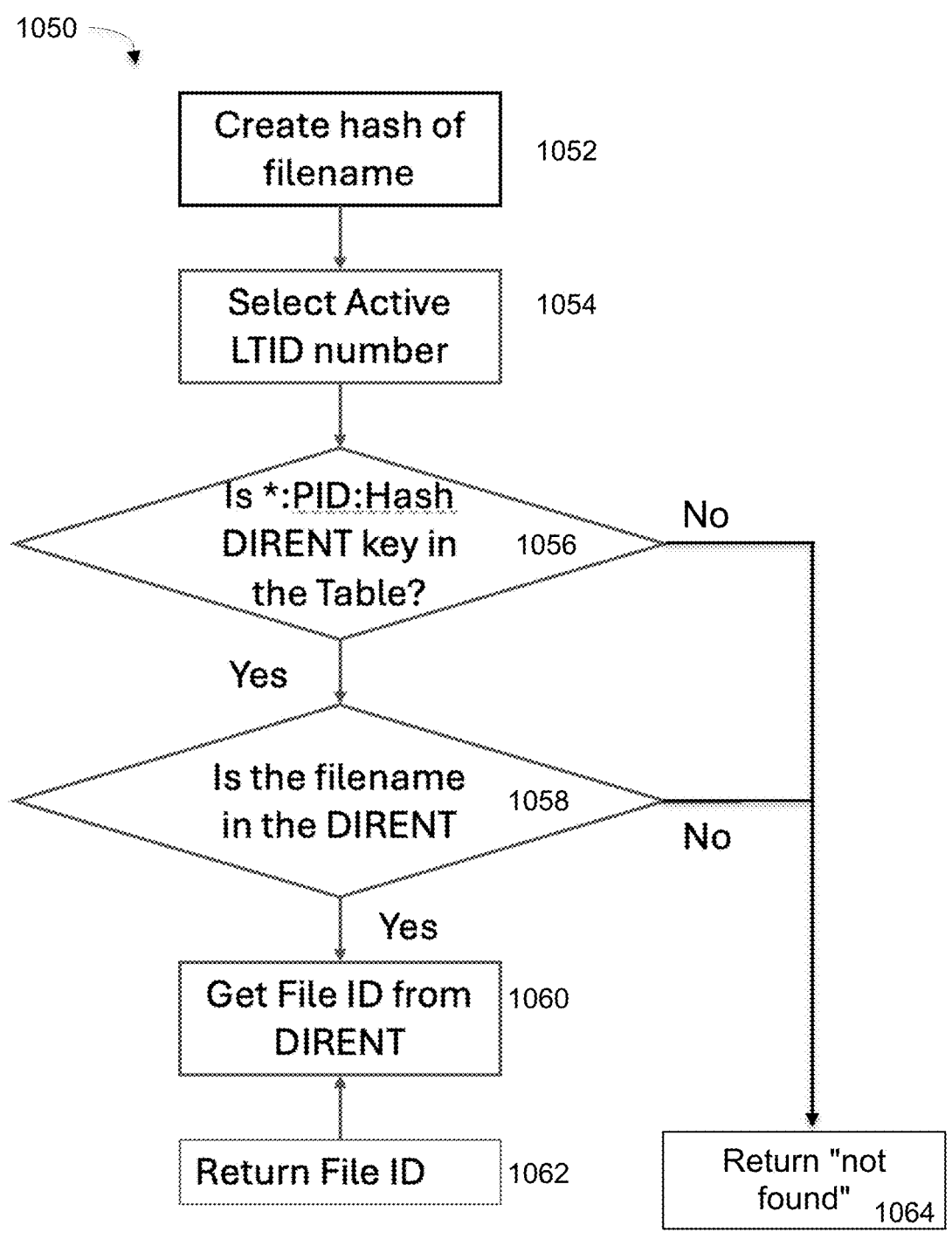
FIG. 10A is a flowchart that shows a method of looking up a first step in a file pathname in a system with wildcard capability, under some embodiments.

FIG. 10A is a flowchart that shows a method of looking up a first step in a file pathname, under some embodiments. The overall process looks up of filename starting with known PID (i.e. 16 for "/") for KVS databases with a wildcard search indicated by "*" that will search the key-space of all the LTIDs in the Mtree table. Process 1050 of FIG. 10A begins with the creation of a hash of the filename, 1052. This name look up is the initial step when opening a file and translating the name to a file-ID, which is the same value as the INODE number. In step 1054, the active LTID number is selected. The wildcard * (*: PID: Hash) DIRENT key is then checked against the table, step 1056. If not, the process ends and returns a file not found message, 1064. If so, the process next checks whether or not the filename is in the DIRENT, 1058. If not, the process ends and returns the file not found message, 1064. If so, the process gets the File ID from the DIRENT, step 1060, and returns the file ID, 1062.

In this process 1050, with the parent ID (the file ID of the directory) and INODE number, the INODE can be obtained and then its permission bits can be checked. If the user opening the file has the required permissions, the information that has been collected is cached, and the full FSID: FID number is returned to the user as a "file handle". Subsequent access with that file handle result in an immediate access with no need to repeat the look-up process. The process 1050 of FIG. 10A illustrates a method for KVS databases with wildcard search capability. In this case, one KVS table is allocated for the entire Mtree, and individual snapshots 608 are simply the set of keys with the same LTID, thus eliminating the need to use separate tables.

Figure 10B:
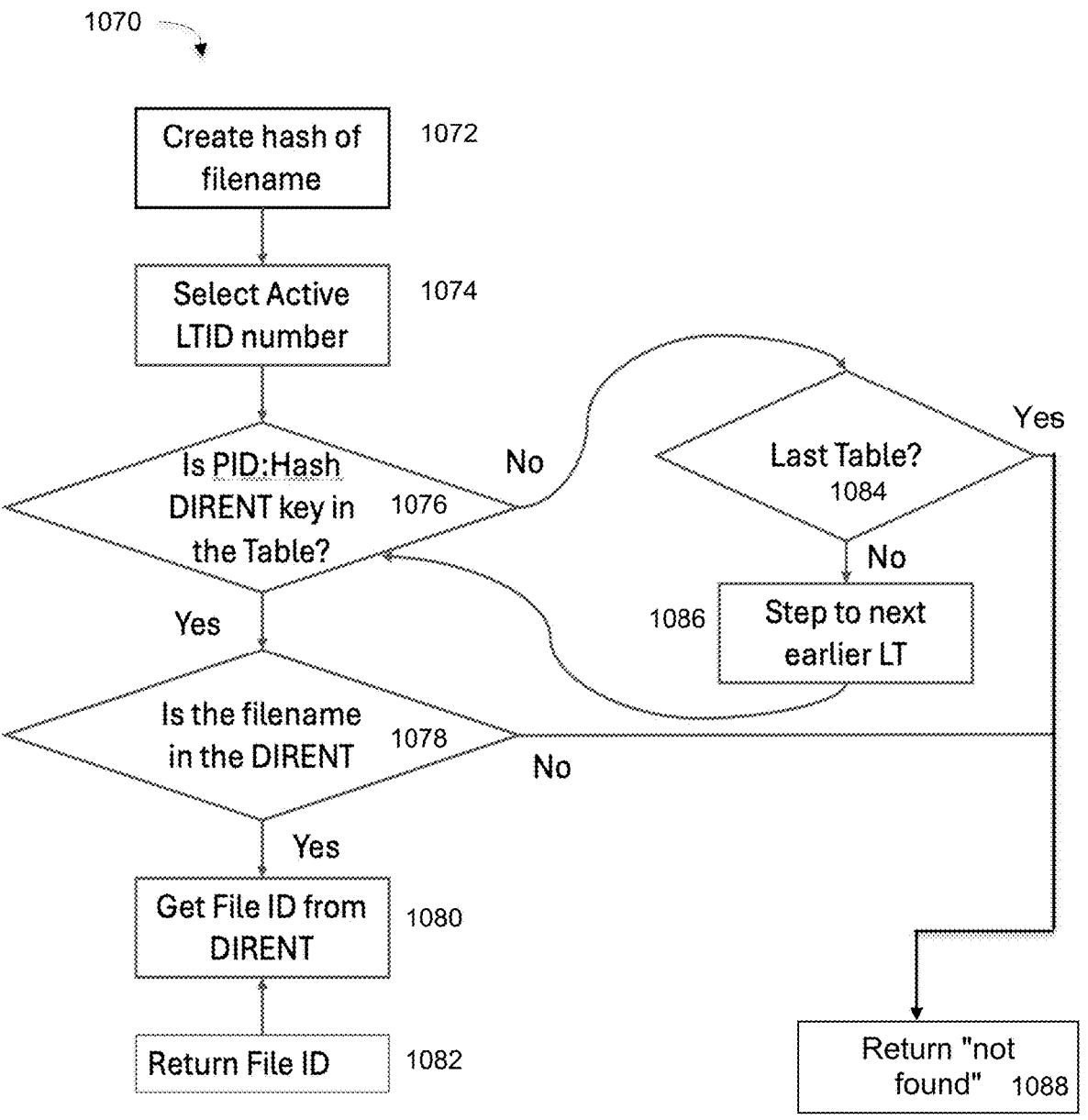
FIG. 10B is a flowchart that shows a method of looking up a first step in a file pathname in a system without wildcard capability, under some embodiments.

FIG. 10B is a flowchart that shows a method of looking up a first step in a file pathname in a system without wildcard capability, under some embodiments. Process 1070 of FIG. 10B is essentially the same as process 1060 of FIG. 10A, but shows the need to iterate over physical tables, one for each LTID, in key value stores without logical tables. This process searches from the newest to the oldest physical table, and stops on the first match, which could result in a search over fewer than all of the tables.

FIG. 10B illustrates a look up of filename starting with known PID (i.e. 16 for "/") for KVS databases without a wildcard search. Process 1070 of FIG. 10B begins with the creation of a hash of the filename, 1072. This name look up is the initial step when opening a file and translating the name to a file-ID, which is the same value as the INODE number. In step 1074, the active LTID number is selected.

The PID: Hash value for the self-identifying" of the INODE and DIRENT structures means that they have a header that defines their type and version and includes the KVS key that is used to reference them as well as a checksum for their entire contents In the event of corruption of a KVS table the individual items when extracted can be used to reconstruct the database in whole or in part. key is then checked against the table, step 1076. If not present, the checks whether this is the last table, 1084, and if so, the process ends and returns a file not found message, 1088. If it is the last table, the process steps to the next earlier LT, 1086, and then performs the DIRENT key check again, 1076.

If the PID: Hash DIRENT key is in the table as determined in step 1076, the process checks whether the filename is in the DIRENT. If not, the process ends and returns the file not found message 1088. If the filename is in the DIRENT, the process gets the file ID from the DIRENT, 1080 and returns the file ID, 1082.

FIG. 11 is a flowchart illustrating an overall method of using a KVS for namespace metadata indexing, under some embodiments. For process 1150, two key value pair (KVP) types are defined, the INODE record to store metadata, and the DIRENT record to store file names, 1151.

For a file system, a KVS logical table group is allocated as the holder of all metadata in a Utable, 1152. The Utable tracks the name of each fileset as well as their snapshot copies, 1154. When a new Mtree is created, an ID is allocated and will be used as the LTGID of the LTG, 1156. The LTGID and logical table ID (LTID) are combined to form a filesystem ID (FSID) that can be exported to external users, 1158. The FSID is combined with a file ID (FID) to reference the file's INODE and the FSID also references a snapshot ID (SID), 1160. For file read/write operations, the FSID selects the LTID of the table for an LTGID, 1162. Upon file creation, name and INODE records are placed in the active KVS table for the fileset or Mtree 1164.

Each new file has an FID that contains a parent-ID (PID) and a child-ID (CID) to the directory location of the file is encoded in the FID, which contains a parent-ID (PID) and a child-ID (CID), and which is stored in the KVS as: FID=[PID: CID], 1166. A file lookup by ID is then performed by using the FSID to identify the starting LTG and getting the actual file handle from the FID, 1168.

The performance characteristics of a namespace on a KVS is expected to be quite different than what a B+ Tree offers. The underlying characteristics of a KVS and particularly its lookup capabilities will most affect that performance.

For KVS systems with generalized wildcard search interfaces, a single physical KVS table can be allocated per logical-table group (i.e. an Mtree and its snapshots), Then the LTID (i.e., a snapshot ID) can be added as a prefix to the INODE and DIRENT key. Then wildcard searches can be used to search all the snapshots for a given file name or INODE instance. For example, this search string would be used to find a file in a given directory, PID, across all the snapshots: <*:PID:name_hash:DIRENT>. An iterator-based wildcard search for instance could return just the first match on the latest LT (i.e., snapshot) containing a particular INODE or DIRENT reference which would be sufficient in most cases.

For KVS system that offer only prefix-based search, individual physical tables must be allocated for each logical table. Lookup operations then requires search all the tables from the newest to the oldest to locate a specific file. To speed these operations filename, look-ups can be performed in parallel across a specified maximum number of tables at a time. Optionally, an index can be maintained that maps INODE file-IDs to an LTID, and similarly maps name hashes to LTIDs to locate DIRENTs. This index would reside in each snapshot and be copied forward to the active when a snapshot is created.

Common to both approaches are the possibility of a bottle neck on a single superKVP (i.e., superblock) in the active LT, as multiple nodes contend to access its structures during file creation and deletions. The are several remedies available such as providing a per-node superkvp that is accessed with via a KVS key that encodes the node-ID of the accessing nodes. Then at snapshot time when all file activity is quiesced these per-node structures can be collated into a single combined structure.

Snapshot Operations

In an embodiment, point-in-time snapshot copies are also formalized using KVS database operations as well operations on sets of snapshots for operations such as garbage collection and data replication.

A snapshot involves the creation of a new logical table, as noted earlier. FIG. 12 is a flowchart that illustrates a method of creating and deleting snapshots using the KVS-based namespace metadata indexing process, under some embodiments.

To create a snapshot, the standard data stabilization activity is commenced like in any filesystem for the data in flight as well as any other metadata such as time stamps etc., into the corresponding INODE record, step 1202. This may involve operations such as quiescing the Mtree, databases, and similar operations. Once this stabilization is complete, a snapshot copy of the fileset can be taken, and the KVS table receiving active metadata is renamed with a snapshot ID for the given fileset (Mtree), step 1204. A brand new KVS logical table is then created for the subsequent active namespace of the fileset and it will receive a copy of the prior snapshots superKVP, step 1206.

The name of the snapshot and a LTID (e.g., DDFS Snapshot ID) for the snapshot is persisted in the Utable entry for this LTGID (e.g., DDFS Mtree ID), step 1208. When a file or directory that already existed in the earlier snapshots is updated or deleted, their corresponding records are copied forward in a copy-on-write (COW) operation if updated, step 1208. Otherwise, it is marked deleted if it is deleted in the active directory.

With respect to snapshot deletion, snapshots are usually created with an expiration time. When it is time for garbage collection, an expired KV logical table corresponding to an expired snapshot can be deleted, step 1212. In an embodiment, when the brand-new active table is created, it will store the running next snapshot identifier in its super block record in the KVS table. This identifier will provide a hint about the oldest directory and file that was processed first in that snapshot. When a snapshot is deleted, it may possibly create a time gap in the overall namespace that is knit by the remaining snapshot and the active KV store tables. In this case, this earliest snapshot identifier will be adjusted down into the snapshot next temporally higher snapshot table or active table.

Embodiments of the processes and techniques described above can be implemented on any appropriate backup system operating environment or file system, or network server system. Such embodiments may include other or alternative data structures or definitions as needed or appropriate. The processes described herein may be implemented as computer programs executed in a computer or networked processing device and may be written in any appropriate language using any appropriate software routines. For purposes of illustration, certain programming examples are provided herein, but are not intended to limit any possible embodiments of their respective processes.

The network of FIG. 1 may comprise any number of individual client-server networks coupled over the Internet or similar large-scale network or portion thereof. Each node in the network(s) comprises a computing device capable of executing software code to perform the processing steps described herein. FIG. 13 is a block diagram of a computer system used to execute one or more software components of providing continuous and/or adaptive namespace verification for single or cluster filesystem, under some embodiments. The computer system 1000 includes a monitor 1011, keyboard 1017, and mass storage devices 1020. Computer system 1000 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 shown in FIG. 10 is an example of a computer system suitable for use with the present system. Other configurations of subsystems will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®. family of systems (e.g., Windows Server), Linux, Mac™ OS X, IRIX32, or IRIX64. Other operating systems may be used.

Although certain embodiments have been described and illustrated with respect to certain example network topographies and node names and configurations, it should be understood that embodiments are not so limited, and any practical network topography is possible, and node names and configurations may be used.

Embodiments may be applied to data, storage, industrial networks, and the like, in any scale of physical, virtual or hybrid physical/virtual network, such as a very large-scale wide area network (WAN), metropolitan area network (MAN), or cloud-based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network. The network may comprise any number of server and client computers and storage devices, along with virtual data centers (vCenters) including multiple virtual machines. The network provides connectivity to the various systems, components, and resources, and may be implemented using protocols such as Transmission Control Protocol (TCP) and/or Internet Protocol (IP), well known in the relevant arts. In a distributed network environment, the network may represent a cloud-based network environment in which applications, servers and data are maintained and provided through a centralized cloud-computing platform.

Some embodiments involve data processing, database management, and/or automated backup/recovery techniques using one or more applications in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Although embodiments are described and illustrated with respect to certain example implementations, platforms, and applications, it should be noted that embodiments are not so limited, and any appropriate network supporting or executing any application may utilize aspects of the backup management process described herein. Furthermore, network environment 100 may be of any practical scale depending on the number of devices, components, interfaces, etc. as represented by the server/clients and other elements of the network. For example, network environment 100 may include various different resources such as WAN/LAN networks and cloud networks 102 are coupled to other resources through a central network 110.

The processes and methods herein have been illustrated with a specific flow, but it should be understood that other sequences may be possible and that some may be performed in parallel. Additionally, steps may be subdivided or combined. Any software disclosed herein may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of processing point-in-time snapshot copies in a cluster file system that maps a file name to an INODE data structure that encapsulates metadata of the file, the method comprising:

stabilizing the cluster file system activities by copying metadata for data currently being processed into a corresponding INODE record;

making a snapshot copy of a fileset of the cluster file system;

creating a key value store (KVS) having key: value elements and utilizing a key value pair (KVP) comprising an INODE type to store metadata and a DIRENT type to store file names;

naming the KVS with a snapshot ID of the snapshot copy; and creating a new KVS logical table for a subsequent active namespace to receive a copy of a prior snapshot copy superKVP, wherein the superKVP comprises a super block record in a KVS of the prior snapshot copy.

2. The method of claim 1 further comprising:

first defining a logical table (LT) of the KVS having a logical table ID (LTID);

second defining a logical table group (LTG) of the KVS containing the LT and having a logical table group ID (LTGID); and storing the file ID as a key element in the KVS, where a corresponding value comprises metadata and associated information for the file for the INODE KVP.

3. The method of claim 2 further comprising:

allocating a KVS logical table group to hold metadata of subcomponents of the fileset as an Umbrella-Table (Utable); and tracking, in the Utable, a name of each fileset and respective snapshot copies in the cluster file system.

4. The method of claim 3 further comprising persisting a name and LTID of the snapshot copy in a Utable entry for a corresponding LTGID.

5. The method of claim 2 further comprising:

determining if any file of the snapshot existed in the prior snapshot and was updated or deleted; and if updated, copying forward corresponding records of a prior existing file in a copy-on-write (COW) operation, or if deleted, marking the file as deleted.

6. The method of claim 1 further comprising performing a snapshot deletion operation by deleting an expired KVS logical table corresponding to an expired snapshot copy.

7. The method of claim 6 further comprising:

storing, for a next snapshot copy, the next snapshot copy ID in a superblock record in a KVS of the next snapshot copy; and upon deletion of the expired snapshot copy, adjusting an earliest snapshot ID in the KVS down into a next temporally higher snapshot table.

8. The method of claim 1 wherein the LT comprises snapshot copies of the file, with each snapshot copy having a unique snapshot ID (SID), and wherein the LTG comprises filesets including snapshot copies.

9. The method of claim 8 wherein the cluster filesystem comprises a network of individual nodes having a log-structured file system implemented in a Data Domain Filesystem, and wherein the namespace contains file metadata implemented as a layered KVS.

10. The method of claim 9 wherein the fileset comprises an Mtree, and wherein the LTID and LTGID form a file system ID (FSID), and further wherein a file handle of the file comprises the FSID plus the File ID.

11. A method of processing point-in-time snapshot copies through indexing file names in a fileset of a cluster file system that maps a file name to an INODE data structure that encapsulates metadata of the file, the method comprising:

deploying a key value store (KVS) database having key: value elements and utilizing a key value pair (KVP) comprising an INODE type to store metadata and a DIRENT type to store file names;

defining a logical table (LT) of the KVS having a logical table ID (LTID), and a logical table group (LTG) of the KVS containing the LT and having a logical table group ID (LTGID);

storing the file ID as a key element in the KVS, where a corresponding value comprises metadata and associated information for the file for the INODE KVP;

making a snapshot copy of fileset;

naming the KVS with a snapshot ID of the snapshot copy; and creating a new KVS logical table for a subsequent active namespace to receive a copy of a prior snapshot copy superKVP, wherein the superKVP comprises a super block record in a KVS of the prior snapshot copy.

12. The method of claim 11 further comprising:

allocating a KVS logical table group to hold metadata of subcomponents of the fileset as an Umbrella-Table (Utable); and tracking, in the Utable, a name of each fileset and respective snapshot copies in the cluster file system.

13. The method of claim 12 further comprising persisting a name and LTID of the snapshot copy in a Utable entry for a corresponding LTGID.

14. The method of claim 12 further comprising:

determining if any file of the snapshot existed in the prior snapshot and was updated or deleted; and if updated, copying forward corresponding records of a prior existing file in a copy-on-write (COW) operation, and if deleted, marking the file as deleted.

15. The method of claim 11 further comprising performing a snapshot deletion operation by deleting an expired KVS logical table corresponding to an expired snapshot copy.

16. The method of claim 15 further comprising:

storing, for a next snapshot copy, the next snapshot copy ID in a superblock record in a KVS of the next snapshot copy; and upon deletion of the expired snapshot copy, adjusting an earliest snapshot ID in the KVS down into a next temporally higher snapshot table.

17. The method of claim 11 wherein the LT comprises snapshot copies of the file, with each snapshot copy having a unique snapshot ID (SID), and wherein the LTG comprises filesets including snapshot copies.

18. The method of claim 17 wherein the cluster filesystem comprises a network of individual nodes having a log-structured file system implemented in a Data Domain Filesystem, and wherein the namespace contains file metadata implemented as a layered KVS.

19. The method of claim 18 wherein the fileset comprises an Mtree, and wherein the LTID and LTGID form a file system ID (FSID), and further wherein a file handle of the file comprises the FSID plus the File ID.

20. A computer program product, comprising a non-transitory computer-readable medium having a computer-readable program code embodied therein, the computer-readable program code adapted to be executed by one or more processors to implement a method of processing point-in-time snapshot copies in a cluster file system that maps a file name to an INODE data structure that encapsulates metadata of the file, and comprising:

stabilizing the cluster file system activities by copying metadata for data currently being processed into a corresponding INODE record;

making a snapshot copy of fileset of the cluster file system;

creating a key value store (KVS) having key: value elements and utilizing a key value pair (KVP) comprising an INODE type to store metadata and a DIRENT type to store file names;

naming the KVS with a snapshot ID of the snapshot copy; and creating a new KVS logical table for a subsequent active namespace to receive a copy of a prior snapshot copy superKVP, wherein the superKVP comprises a super block record in a KVS of the prior snapshot copy.

* * * * *